(12) United States Patent
Nagano et al.

(10) Patent No.: US 6,344,008 B1
(45) Date of Patent: Feb. 5, 2002

(54) HYBRID VEHICLE

(75) Inventors: Shuji Nagano, Toyota; Kojiro Kuramochi, Okazaki, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 18 days.

(21) Appl. No.: 09/632,328

(22) Filed: Aug. 4, 2000

(30) Foreign Application Priority Data

Aug. 6, 1999 (JP) ............................................. 11-224165

(51) Int. Cl.[7] ................................................ F16H 37/06
(52) U.S. Cl. ................................ 475/1; 475/5; 475/10; 475/211
(58) Field of Search ............................ 475/1, 5, 8, 10, 475/210, 211, 329

(56) References Cited

U.S. PATENT DOCUMENTS

| 5,803,859 A | * | 9/1998 | Haka | 475/211 |
| 5,846,155 A | * | 12/1998 | Taniguchi et al. | 475/5 |
| 5,856,709 A | * | 1/1999 | Ibaraki et al. | 475/5 |
| 5,895,333 A | * | 4/1999 | Morisawa et al. | 475/5 |
| 6,146,302 A | * | 11/2000 | Kashiwase | 475/5 |

FOREIGN PATENT DOCUMENTS

| JP | 59-149824 | 8/1984 |
| JP | 9-37411 | 2/1997 |

* cited by examiner

Primary Examiner—Sherry Estremsky
(74) Attorney, Agent, or Firm—Kenyon & Kenyon

(57) ABSTRACT

A hybrid vehicle comprises: a first driving force source; a transmission for transmitting the torque of the first driving force source therethrough to wheels; a second driving force source; and a torque transmitting route interposed between the driving force source and the wheels for inputting the torque of the second driving force source. The hybrid vehicle further comprises a torque adding route for synthesizing the torque outputted from the transmission and the torque transmitted from the second driving force source, to output the synthesized torque to an output member.

29 Claims, 9 Drawing Sheets

FIG.3

| DRIVE PATTERNS | C1 | C2 | B1 | BR | DRIVE (DRIVEN) MEANS |
|---|---|---|---|---|---|
| CREEP RUN | | ◯ | | | MOTOR/GENERATOR |
| ORDINARY START | ◯ | ◯ | (△) | | ENGINE + MOTOR/GENERATOR |
| ORDINARY RUN | ◯ | ◯ | | | ENGINE (MOTOR/GENERATOR) |
| REGENERATIVE BRAKE | | | | | MOTOR/GENERATOR |
| BACKWARD RUN | ◯ | | | ◯ | ENGINE |

FIG.9

| DRIVE PATTERNS | C0 | B0 | F1 | F2 | B1 | DRIVE (DRIVEN) MEANS |
|---|---|---|---|---|---|---|
| CREEP RUN | O | | | O | O | MOTOR/GENERATOR (AT ECO-RUN) |
| ORDINARY START | O | | | O | O | ENGINE + MOTOR/GENERATOR |
| ORDINARY RUN | | | O | △ | O | ENGINE (MOTOR/GENERATOR) |
| REGENERATIVE (POWER-GENERATING) BRAKE | | | | | O | MOTOR/GENERATOR |
| BACKWARD RUN | | O | | | | ENGINE |

HYBRID VEHICLE

BACKGROUND OF THE INVENTION

1. Field of the Invention

The present invention relates to a vehicle which is constructed to transmit a torque of a driving force source through a transmission to wheels and, more particularly, to a hybrid vehicle in which a torque of another driving force source can be inputted to a torque transmitting route between one driving force source and the wheels.

2. Related Art

As well known in the art, an internal combustion engine outputs a kinetic energy by mixing and burning air and a fuel. As a result, the internal combustion engine discharges exhaust gases inevitably. The constituents and amount of the exhaust gases depend a running state of the internal combustion engine. According to the general tendency, not only the clarification of the exhaust gases but also the fuel economy are liable to become low at a high-load running time when the throttle opening is large. In recent years, on the contrary, a demand for the clarification of the exhaust gases of the vehicle having the internal combustion engine mounted thereon grows higher and higher. In order to satisfy this demand, there has been developed a hybrid vehicle which has an engine, an electric motor and a transmission mounted thereon. In this hybrid vehicle, the running state is judged on the basis of the accelerator opening and the vehicle speed to drive/stop the engine and the electric motor and to control a gear ratio of the transmission in accordance with the result of judgment.

One example of the hybrid vehicle thus having the engine, the electric motor and the transmission mounted thereon is disclosed in Japanese Patent Laid-Open No. 9-37411. According to this disclosure, the vehicle is constructed such that the torque of the engine is inputted through a planetary gear mechanism to a continuously variable transmission. On the other hand, the output side of the continuously variable transmission is connected to transmit the torque to the wheels. The continuously variable transmission is provided with an input rotary member, an output rotary member and a disc. These input rotary member and output rotary member are formed to have arcuate faces. Moreover, the disc is in contact with the arcuate face of the input rotary member and the arcuate face of the output rotary member. Th is continuously variable transmission is the so-called "toroidal type continuously variable transmission". On the other hand, the output rotary member and the wheels are so connected as to transmit the torque.

The planetary gear mechanism includes a sun gear, a ring gear, and a carrier holding a pinion gear meshing with the sun gear and the ring gear. Moreover, the engine and the ring gear are connected in the torque transmittable manner, and the carrier and the input rotary member are connected in the torque transmittable manner. On the other hand, the sun gear and the electric motor are connected in the torque transmittable manner. Of the rotary element s of the planetary gear mechanism, moreover, the ring gear to which the torque of the engine is inputted acts as an input element. When this ring gear rotates, the sun gear to which the torque of the electric motor is inputted acts as a reaction element so that its torque is outputted from the carrier. The torque thus outputted from the carrier is inputted to the continuously variable transmission. In this continuously variable transmission, the gear ratio is set on the basis of a ratio between a radius of a contact point between the disc and the input rotary member and a radius of a contact point between the disc and the output rotary member. Therefore, the torque, as inputted to the continuously variable transmission, is decelerated or accelerated according to the gear ratio and transmitted to the wheels.

In the hybrid vehicle thus described, however, the high torque, as decelerated or synthesized by the planetary gear mechanism, is inputted to the continuously variable transmission. As a result, a slippage may occur between the torque transmitting members for transmitting the torque between the input side and the output side of the continuously variable transmission, that is, between input rotary member and the output rotary member, and the disc, to lower the transmission efficiency of the motive power. In order to prevent this slippage, on the other hand, the input/output members and the disc have to be brought into contact by a stronger force. The rise in this contact pressure may lower the transmission efficiency of the motive power.

SUMMARY OF THE INVENTION

A main object of the invention is to improve a transmission efficiency of a motive power in a transmission and to make the system compact.

A specific object of the invention is to improve a transmission efficiency of a motive power in a hybrid vehicle including at least two driving force sources and a continuously variable transmission.

Another object of the invention is to make compact an entire construction of a system including a mechanism for switching a drive state into a backward run.

According to a feature of the invention, there is provided a hybrid vehicle which comprises: a first driving force source; a transmission for transmitting the torque of the first driving force source therethrough to wheels; a second driving force source; and a torque transmitting route interposed between the first driving force source and the wheels for inputting the torque of the second driving force source. The hybrid vehicle further comprises a torque adding route for synthesizing the torque outputted from the transmission and the torque transmitted from the second driving force source, to output the synthesized torque to an output member.

The first driving force source can be constructed of an internal combustion engine, and the second driving force source can be constructed of an electric motor or a motor/generator. Moreover, the transmission can be constructed of a continuously variable transmission.

The torque of the second driving force source is added on the output side of the transmission to the output torque of the transmission. Therefore, the torque to be applied to the transmission is one to be transmitted from the first driving force source, i.e., a relatively low torque so that the transmission efficiency of the motive power in the transmission is improved.

Especially if the transmission is a belt type continuously variable transmission, the slippage of the belt is suppressed because of the low transmitted torque, and the transmission efficiency of the motive power is improved because a tension to be applied to the belt is lowered.

The torque adding route in the hybrid vehicle of the invention can be constructed of a Ravigneaux type planetary gear mechanism, one set of single-pinion type planetary gear mechanisms or a plurality of sets of planetary gear mechanisms.

When the torque adding route is constructed of the planetary gear mechanism, at least two high and low gear ratios can be set by the planetary gear mechanism. With this construction, it is possible to increase/decrease the torque to be outputted by the second driving force source. On the other hand, it is possible to change the RPM (i.e., revolutions per minute) of the case in which the second driving force source is forcibly driven.

When the torque adding route is constructed of the planetary gear mechanism, moreover, it is possible to give a forward/backward switching function to reverse and output the torque inputted. With this construction, the system can be made compact as a whole.

The above and further objects and novel features of the invention will more fully appear from the following detailed description when the same is read with reference to the accompanying drawings. It is to be expressly understood, however, that the drawings are for the purpose of illustrations only and are not intended as a definition of the limits of the invention.

BRIEF DESCRIPTION OF THE DRAWINGS

FIG. 3 is a diagram tabulating corresponding relations between frictional engagement elements shown in FIG. 1 and individual drive patterns;

FIG. 9 is a diagram tabulating corresponding relations between frictional engagement elements of the system shown in FIG. 8 and individual controls.

DETAILED DESCRIPTION OF THE PREFERRED EMBODIMENTS

Figure 1:
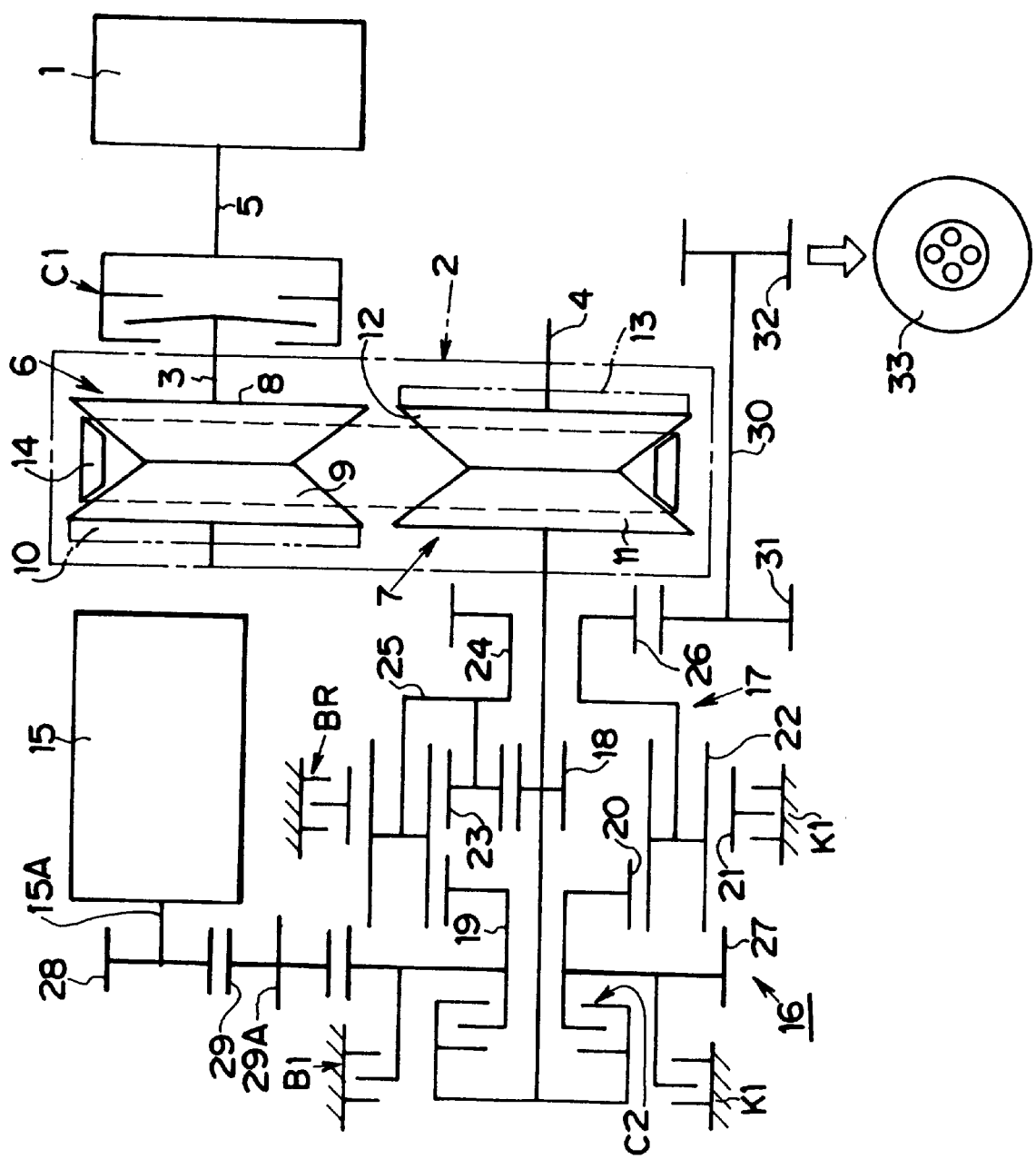
FIG. 1 is a skeleton diagram showing one embodiment of a hybrid vehicle according to the invention.

The invention will be specifically described with reference to the accompanying drawings. On a hybrid vehicle according to the invention, there is mounted an engine 1, as shown in FIG. 1, which can be exemplified by an internal combustion engine such as a gasoline engine, a Diesel engine or an LPG engine. Here will be conveniently described the case in which the gasoline engine is mounted as the engine 1. This engine 1 can be exemplified by the well-known one provided with intake and exhaust units, a lubricating unit, a cooling unit, a fuel injection unit, an ignition unit, a starter unit and so on.

On the output side of the engine 1, moreover, there is provided a continuously variable transmission (CVT) 2. This continuously variable transmission 2 is disposed in a hollow casing K1. The continuously variable transmission 2 is equipped with an input shaft 3 and an intermediate shaft 4, which are arranged in parallel with each other. On the other hand, the engine 1 is equipped with a crankshaft 5, which is arranged coaxially with the input shaft 3. On a torque transmitting route between the crankshaft 5 and the input shaft 3, moreover, there is disposed a start clutch C1. This start clutch C1 is a hydraulic type wet multi-disc clutch including a plurality of (not-shown) clutch plates, a plurality of (not-shown) clutch discs, a (not-shown) return spring and a (not-shown) hydraulic servo mechanism.

The continuously variable transmission 2 is further equipped with a drive-side pulley (or primary pulley) 6 and a driven-side pulley (or secondary pulley) 7. The drive-side pulley 6 is disposed on the side of the input shaft 3, and the driven-side pulley 7 is disposed on the side of the intermediate shaft 4. The drive-side pulley 6 is equipped with a stationary sieve 8 and a movable sieve 9. The stationary sieve 8 is fixed on the input shaft 3, and the movable sieve 9 is made movable in the axial direction of the input shaft 3. On the other hand, there is provided a hydraulic actuator 10 for moving the movable sieve 9 in the axial direction of the input shaft 3. The hydraulic actuator 10 is well-known to include a (not-shown) piston for moving in the axial direction of the input shaft 3, and a (not-shown) return spring.

On the other hand, the driven-side pulley 7 is equipped with a stationary sieve 11 and a movable sieve 12. The stationary sieve 11 is fixed on the intermediate shaft 4, and the movable sieve 12 is made movable in the axial direction of the intermediate shaft 4. On the other hand, there is provided a hydraulic actuator 13 for moving the movable sieve 12 in the axial direction of the intermediate shaft 4. The hydraulic actuator 13 is well-known to include a (not-shown) piston for moving in the axial direction of the intermediate shaft 4, and a (not-shown) return spring. Moreover, a belt 14 is made to run on the drive-side pulley 6 and the driven-side pulley 7. In other words, the torque is transmitted through the belt 14 between the drive-side pulley 6 and the driven-side pulley 7.

Inside of the casing K1, on the other hand, there are disposed a motor/generator 15 and a torque adding route 16. The motor/generator 15 has a function to convert a kinetic energy and an electric energy into each other. Specifically, the motor/generator 15 has both a function (or a power function) as an electric motor to output a torque according to an electric power supplied, and a function (or a regenerative function) as a power generator to generate an electric energy from a motive power inputted from the outside.

The torque adding route 16 transmits the torque of the motor/generator 15 to the output side of the continuously variable transmission 2 and is provided with a planetary gear mechanism 17. This planetary gear mechanism 17 is the so-called "Ravigneaux type planetary gear mechanism" which is constructed by combining two planetary gear units. This planetary gear mechanism 17 is equipped with a first sun gear 18 and a first hollow shaft 19. The first sun gear 18 is mounted on the intermediate shaft 4. The first hollow shaft 19 is arranged so coaxially with and around the intermediate shaft 4 that it can rotate relative to the intermediate shaft 4. A second sun gear 20 is mounted on the first hollow shaft 19. On the other hand, a clutch C2 is provided for controlling a torque transmitting state between the intermediate shaft 4 and the first hollow shaft 19. On the inner face of the casing K1, moreover, there is disposed a first brake B1 for controlling the rotation/stop of the first hollow shaft 19.

Around the first sun gear 18, on the other hand, there is arranged a ring gear 21, which is meshed together with the second sun gear 20 by a second pinion gear 22. On the other hand, these second pinion gear 22 and first sun gear 18 are meshed by a first pinion gear 23. Coaxially with and around the intermediate shaft 4, on the other hand, there is disposed a second hollow shaft 24 which can rotate relative to the intermediate shaft 4. On the other hand, the second pinion gear 22 and the first pinion gear 23 are held by a carrier 25, which is so connected to the second hollow shaft 24 as to transmit the torque. On the inner face of the casing K1, moreover, there is mounted a reverse brake BR for controlling the rotation/stop of the ring gear 21. Still moreover, a gear 26 is formed on the second hollow shaft 24.

Here, a gear 27 is formed on the outer circumference of the first hollow shaft 19, and a gear 28 is formed on the output shaft 15A of the motor/generator 15. In parallel with the intermediate shaft 4, on the other hand, there is disposed a shaft 29A which is provided with a gear 29. The gear 27 and the gear 28 are meshed with the gear 29.

In parallel with the intermediate shaft 4, on the other hand, there is disposed an output shaft 30. This output shaft 30 is also disposed inside of the casing K1. The output shaft 30 is provided with a gear 31 and a gear 32. Moreover, the gear 31 and the gear 26 mesh each other, and the gear 32 and wheels 33 are so connected through a (not-shown) differential gears as to transmit the torque.

Figure 2:
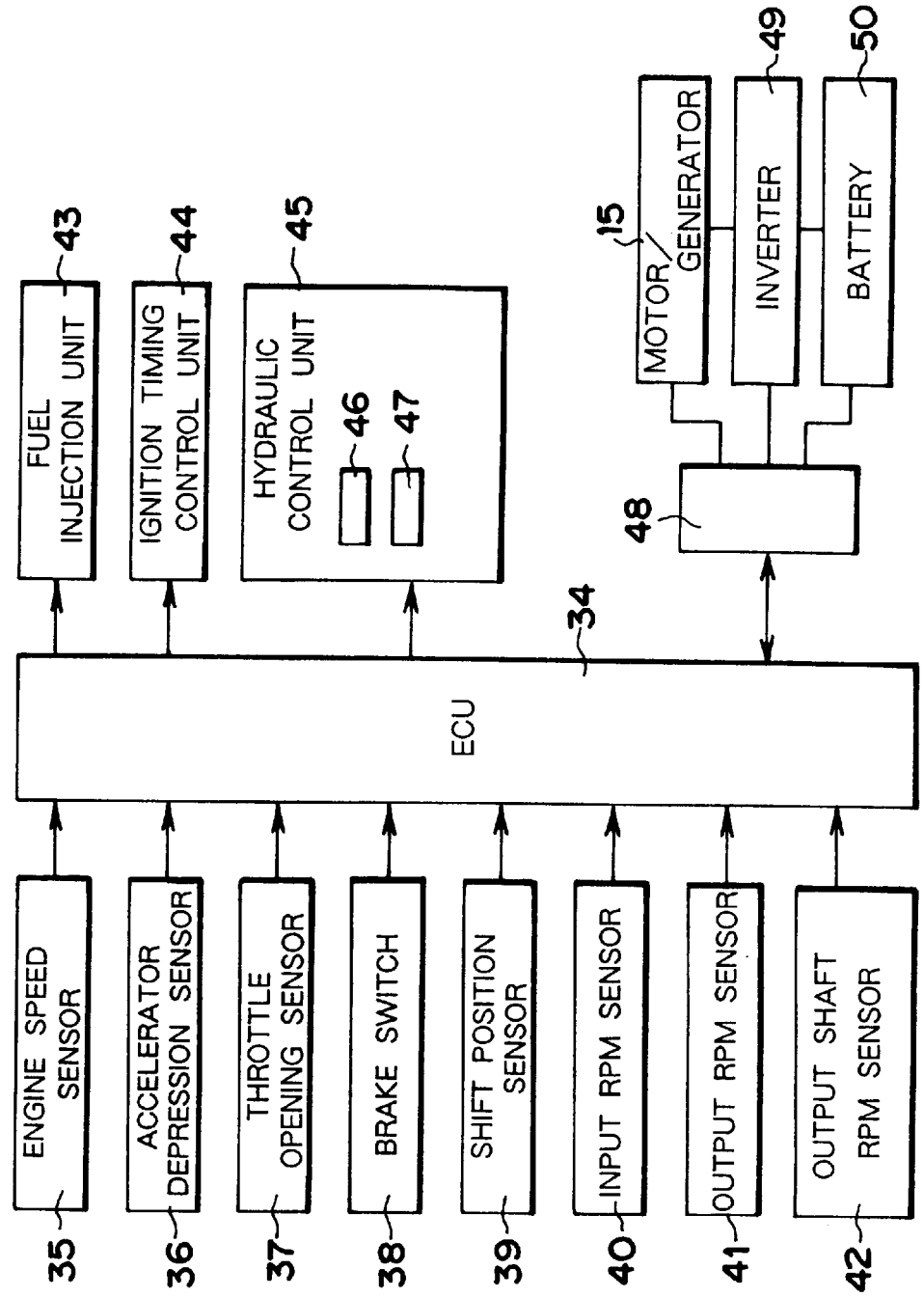
FIG. 2 is a block diagram showing a control system corresponding to the hybrid vehicle of FIG. 1.

A control system of the vehicle having the system shown in FIG. 1 will be described with reference to the block diagram of FIG. 2. First of all, there is provided an electronic control unit (ECU) 34. This electronic control unit 34 is provided for controlling the engine 1, the continuously variable transmission 2 and the frictional engagement elements (i.e., the aforementioned various brakes and clutches).

The electronic control unit 34 is constructed to include a microcomputer composed mainly of a processing unit (e.g., CPU or MPU), storage units (e.g., RAM and ROM) and an input/output interface. To this electronic control unit 34, there are inputted: a signal of an engine speed sensor 35; a signal of an accelerator depression sensor 36; a signal of a throttle opening sensor 37; a signal of a brake switch 38; a signal of a shift position sensor 39 for detecting an operating state of a (not-shown) shift lever; a signal of an input RPM sensor 40 for detecting the RPM (i.e., revolutions per minute) of the drive-side pulley 6; a signal of an output RPM sensor 41 for detecting the RPM of the driven-side pulley 7; and a signal of an output shaft RPM sensor 42 for detecting the RPM of the output shaft 30. The vehicle speed is calculated on the basis of the signal of the output shaft RPM sensor 42.

With the electronic control unit 34, moreover, there are connected in a data communicable manner a fuel injection unit 43, an ignition timing control unit 44 and a hydraulic control unit 45. This hydraulic control unit 45 is equipped with a variety of solenoid valves 46 and a solenoid valve 47. The various solenoid valves 46 are provided for controlling oil pressures to act on the start clutch C1, the clutch C2, the brake B1 and the reverse brake BR on the basis of the operating state of the shift lever and other conditions. On the other hand, the solenoid valve 47 controls oil pressures to act on the hydraulic actuators 10 and 13.

With the electronic control unit 34, moreover, there is connected in a data communicable manner an electronic control unit 48 for the aforementioned motor/generator 15. With this motor/generator 15, on the other hand, there is electrically connected a battery 50 through an inverter 49. Moreover, the motor/generator electronic control unit 48 is connected in a data communicable manner with the motor/generator 15, the inverter 49 and the battery 50. Moreover, the motor/generator electronic control unit 48 is provided with both a function to detect and control a current value to be fed to the motor/generator 15 from the battery 50 and a function to detect a current value of an electric energy generated by the motor/generator 15. The motor/generator electronic control unit 48 is further provided with both a function to control the RPM of the motor/generator 15 and a function to detect and control the state of charge (SOC) of the battery 50.

Here will be described the corresponding relations between the construction of the aforementioned embodiment and the construction of the invention. The engine 1 corresponds to the first driving force source of the invention, and the crankshaft 5, the input shaft 3, the intermediate shaft 4 and the output shaft 30 construct a route corresponding to the torque transmitting route of the invention. On the other hand, the motor/generator 15 corresponds to a second driving force source of the invention, and the gears 27, 28 and 29 and the first hollow shaft 19 construct a route corresponding to the torque adding route of the invention.

Here will be described the operations and controls of the hybrid vehicle having the construction thus far described. By operating the shift lever, there are selected either: a drive position for setting a state to transmit the torque (or motive power) of at least one of the engine 1 and the motor/generator 15 to the wheels 33; or a non-drive position for setting a state to transmit neither the torques of the engine 1 and the motor/generator 15 to the wheels 33. The drive position is exemplified by a drive position or a reverse position, and a non-drive position is exemplified by a neutral position or a parking position. The drive position is a position for driving the vehicle forward, and the reverse position is a position for backing the vehicle.

When the drive position is selected, moreover, one of the various drive patterns is selected on the basis of the vehicle state, for example, the vehicle speed, the accelerator depression, the throttle opening or the shift position, for example, to make the control corresponding to the drive pattern. The drive patterns include the various patterns such as a creep run, an ordinary start, an ordinary run, a regenerative brake and a backward run, as tabulated in FIG. 3. When the drive position is selected by the shift lever, moreover, it is possible to select any of the individual patterns of the creep run, the ordinary start, the ordinary run and the regenerative brake. When the reverse position is selected, on the other hand, the pattern of the backward run is selected.

Figure 4:
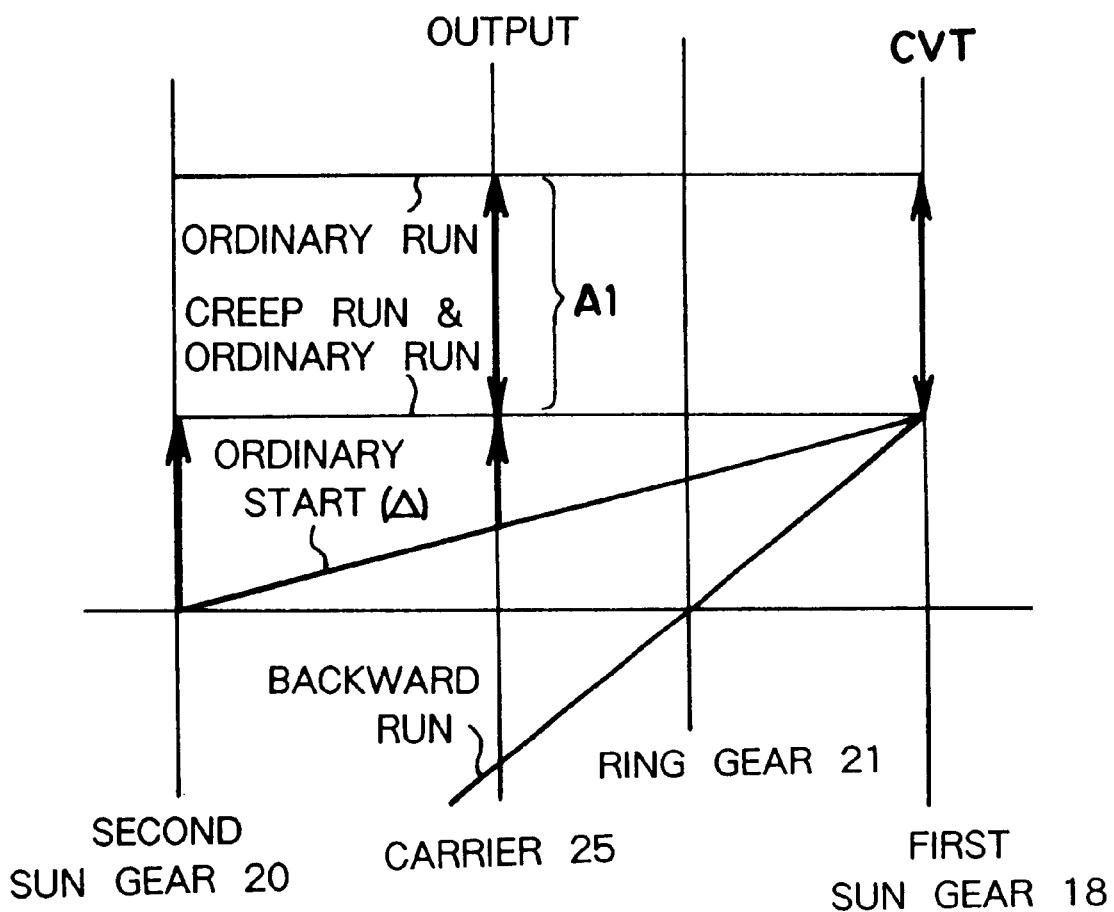
FIG. 4 is a nomographic diagram illustrating the states of rotary elements of a planetary gear mechanism in the embodiment of FIG. 1.

The controls corresponding to the individual drive patterns will be described with reference to FIGS. 3 and 4. Of these, FIG. 3 tabulates the corresponding relations between the individual drive patterns and the states of the frictional engagement elements including the clutches and the brakes. FIG. 3 also tabulates the drive means (or the driving force sources of the vehicle) in the individual drive patterns. In FIG. 3: "circle" symbols imply that the frictional engagement elements are applied; blanks imply that the frictional engagement elements are released; and a "triangle" symbol imply that the frictional engagement element is applied when the vehicle is quickly started (e.g., when the accelerator depression is large). On the other hand, FIG. 4 is a nomographic diagram illustrating the states of the first sun gear 18, the second sun gear 20, the carrier 25 and the ring gear 21 in the individual drive patterns. In FIG. 4, arrows designate the directions of rotations.

First of all, the creep run pattern is selected while there is active the so-called "ECO-run system", as intended here to have the meaning of "ECOnomical-ECOlogical run", for controlling the running/stopping of the engine 1 on the basis of a predetermined condition other than an operation of a (not-shown) ignition key. Specifically, this creep run pattern is selected, when a condition for returning the engine 1 to the running state is satisfied while the engine 1 is being automatically stopped under the engine stopping condition. More specifically, the creep run pattern is selected with a view to retaining the force for driving the wheels 33 for the time period from the satisfaction of the returning condition during the engine stop to the start of the engine 1. Here, the condition for the engine stop is satisfied, for example, when the accelerator pedal is fully released, when the vehicle speed is at zero and when the brake switch 38 is turned ON. On the other hand, the returning condition is satisfied when at least one of the engine stopping conditions is dissatisfied.

In this creep run control, the clutch C2 is applied, but the other clutches and the brakes are released. In short, the second sun gear 20 and the first sun gear 18 are directly connected. As a result, the torque, as outputted from the motor/generator 15, is transmitted through the gears 28, 29 and 27 to the first sun gear 18 and the second sun gear 20, and the first sun gear 18, the second sun gear 20 and the carrier 25 rotate altogether, as shown in FIG. 4. The torque of this carrier 25 is transmitted through the second hollow shaft 24 and the gear 26 to the output shaft 30. The torque of this output shaft 30 is transmitted to the wheels 33 to generate the driving force of the wheels 33. When the creep run pattern is thus selected, the vehicle runs by using the motor/generator 15 as the drive means.

Here will be described the ordinary start pattern. This ordinary start pattern is selected when the vehicle stops and when a demand for the start is made while the engine 1 is active. Whether or not the demand for the start is made is decided on the basis of the signal of the accelerator depression sensor 36, the signal of the brake switch 38 and so on. When this ordinary start pattern is selected, the start clutch C1 is applied, but the other clutches and the brakes are released. Then, the torque, as outputted from the crankshaft 5 of the engine 1, is transmitted to the input shaft 3 of the continuously variable transmission 2. The torque of the input shaft 3 is transmitted through the drive-side pulley 6, the belt 14 and the driven-side pulley 7 to the intermediate shaft 4. The torque thus transmitted to the intermediate shaft 4 is further transmitted through the first sun gear 18 and the first pinion gear 23 to the carrier 25.

On the other hand, the torque of the motor/generator 15 is transmitted through the gears 28, 29 and 27 to the second sun gear 20. As a result, the second sun gear 20 acts as a reaction element so that the carrier 25 is decelerated in its rotations with respect to the first sun gear 18. On the other hand, the torque of the carrier 25 is transmitted through the second hollow shaft 24 and the gear 26 to the output shaft 30. Specifically, the carrier 25 or the gear 26 to act as the output element is further decelerated in its rotations with respect to the intermediate shaft 4 by the planetary gear mechanism 17. On the other hand, this torque of the carrier 25 or the gear 26 is a summed high torque of the torque to be transmitted from the engine 1 through the first sun gear 18 and the torque to be transmitted from the motor/generator 15 through the second sun gear 20.

Figure 5:
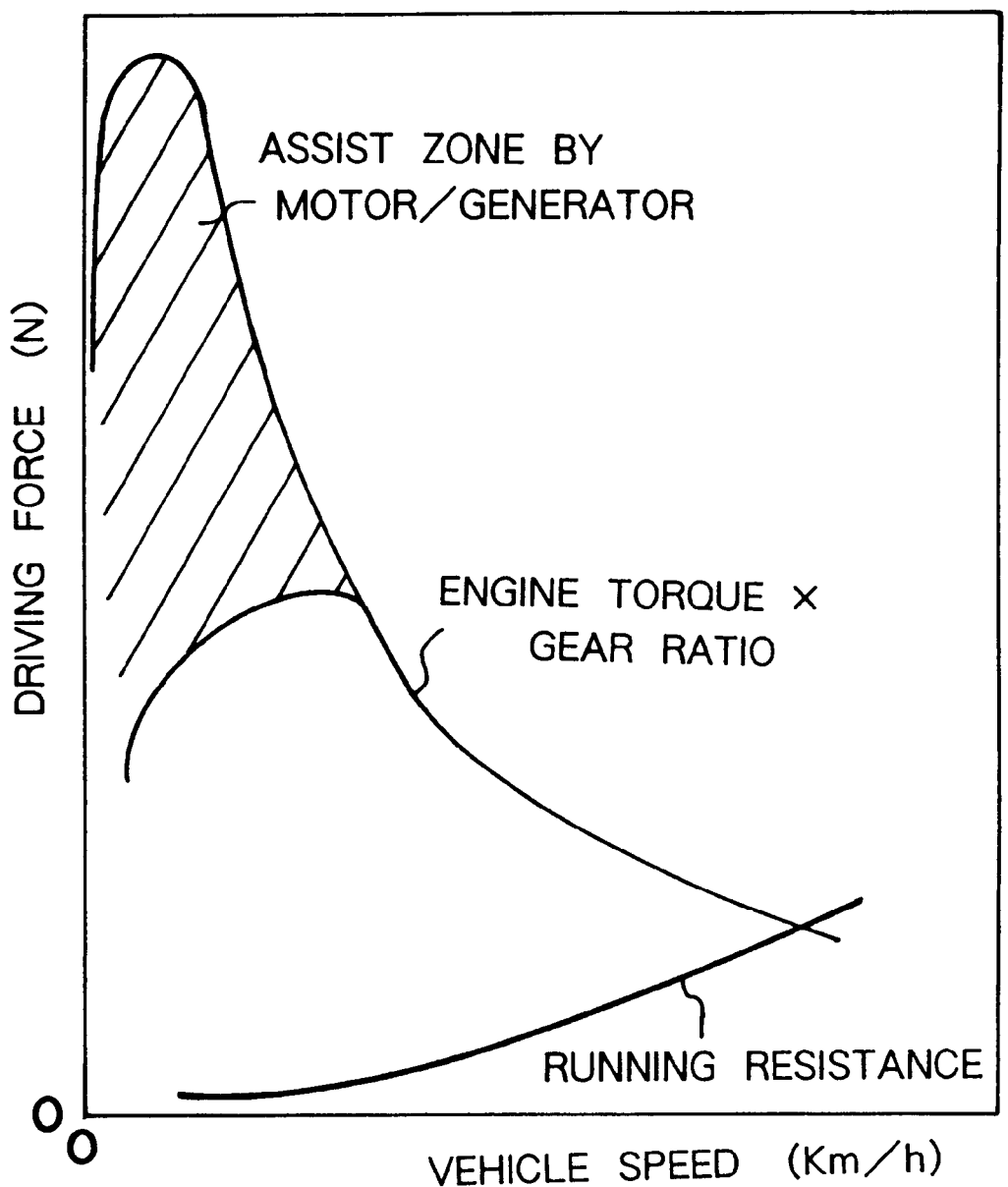
FIG. 5 is a diagram illustrating relations between a vehicle speed and a driving force in a control example according to the invention.

FIG. 5 is a diagram illustrating the relations between the vehicle speed and the driving force of the vehicle. In this diagram, there are illustrated: a running resistance of the vehicle; a (fundamental) driving force corresponding to a product which is calculated by multiplying the engine torque by the gear ratio; and a (hatched) zone in which the fundamental driving force is assisted by the motor/generator 15. As seen from this driving force diagram of FIG. 5, the fundamental driving force is characterized to increase with the rise in the vehicle speed and to decrease at the instant when a predetermined vehicle speed is exceeded.

By selecting the ordinary start pattern, therefore, the driving force of the vehicle at a lower speed than a predetermined speed can be increased within a range of the assist zone. The driving force thus increased is substantially similar to that of the hybrid vehicle in which the so-called "torque converter" is disposed on the torque transmitting route between the engine and the continuously variable transmission. In other words, a torque amplifying function similar to that by the torque converter can be achieved by the motor/generator 15 and the planetary gear mechanism 17.

When the ordinary start pattern is selected, more specifically, the output torque of the engine 1 is amplified by the continuously variable transmission 2 and the planetary gear mechanism 17, and the torque, as outputted from the motor/generator 15, is added to the output torque of the engine 1, so that these summed torque is transmitted to generate the driving force of the wheels 33. In other words, when the ordinary start pattern is selected, the engine 1 and the motor/generator 15 act as the drive means for the vehicle.

When the start demand made is a demand for a quick start, on the other hand, not only the start clutch C1 but also the brake B1 is applied. Whether or not this demand for the quick start is made is decided on the basis of whether the rate of change (or the changing ratio) of the accelerator depression per unit time exceeds a predetermined value. When the brake B1 is thus applied, the second sun gear 20 is fixed, as illustrated in FIG. 4. As a result, even when the torque to be transmitted to the intermediate shaft 4 abruptly rises, the backward rotation of the second sun gear 20 or the reaction element can be reliably prevented to retain the driving force of the wheels 33. On the other hand, the brake B1 can be controlled not only to the released/applied state but also to a slipping state. By receiving the reaction in this slipping state of the brake B1, the speed change at the continuously variable transmission 2 can be made in association with the motor/generator 15.

When the vehicle is started to exceed a predetermined vehicle speed, moreover, the ordinary run pattern is selected. Then, the start clutch C1 and the clutch C2 are applied, but the other clutches and the brakes are released. When the engine torque is transmitted like before to the intermediate shaft 4, therefore, the first sun gear 18, the second sun gear 20 and the carrier 25 rotate altogether, as shown in FIG. 4. Moreover, the torque of the carrier 25 is transmitted like before to the wheels 33. When this ordinary run pattern is selected, therefore, the RPM of the output shaft 30 can be controlled within a range A1 of FIG. 4 by controlling the gear ratio of the continuously variable transmission 2.

Here will be described the control of the gear ratio of the continuously variable transmission 2. In this continuously variable transmission 2, the distance between the stationary sieve 8 and the movable sieve 9, i.e., the groove width is adjusted by controlling the oil pressure to act on the hydraulic actuator 10. On the contrary, the oil pressure to determine the groove width of the driven-side pulley 7 is controlled to give the belt 14 a tension according to the magnitude of the torque to be transmitted, so that the groove width of the driven-side pulley 7 changes with the change in the groove width of the drive-side pulley 6. As a result, the winding radii of the belt 14 on the individual pulleys 6 and 7 change to control the gear ratio (i.e., the value calculated by dividing the RPM of the input shaft 3 by the RPM of the intermediate shaft 4) of the continuously variable transmission 2 steplessly (or continuously).

On the basis of the signals of the various sensors and other data, on the other hand, the electronic control unit 34 controls the engine 1, the continuously variable transmission 2 and the various frictional engagement elements. For these controls, the electronic control unit 34 are stored in advance with the various data such as shift maps therefor and optimum fuel economy curves for the engine. The shift maps for the continuously variable transmission are prepared for controlling the gear ratio of the continuously variable transmission 2 and are set with such a gear ratio for the continuously variable transmission 2 as matches the vehicle state such as the accelerator depression (or the throttle opening) and the vehicle speed.

On the other hand, the optimum fuel economy curves for the engine are prepared for deciding the propriety of the fuel economy by using the conditions of the engine torque, the engine RPM and so on as parameters. On the basis of the vehicle speed, the accelerator depression and so on, moreover, a demand for an acceleration is decided so that a target engine output is determined as based on the result of the decision. On the basis of these operation results and the optimum fuel economy curves, the target engine RPM is determined to control the gear ratio of the continuously variable transmission 2 so that the actual engine RPM may approach the target one. The shift control of the continuously variable transmission 2 and the control of the engine RPM are applied to the ordinary start pattern or the ordinary run pattern.

When the aforementioned backward run pattern is selected, the start clutch C1 and the reverse brake BR are applied, but the other brakes and clutches are released. In short, the ring gear 21 is brought into the fixed state. When the torque of the intermediate shaft 4 is transmitted to the first pinion gear 23, therefore, the ring gear 21 acts as the reaction element, and the carrier 25 rotates in the opposite direction to the rotations of the other drive patterns. Here, no torque is transmitted from the motor/generator 15. Thus, the engine 1 acts as the drive means for the vehicle when the backward run pattern is selected.

Here will be described the controls of the regenerative brake pattern. This regenerative brake pattern is selected while the vehicle is being decelerated, that is, while vehicle is coasting. When this regenerative brake pattern is selected, the clutch C2 is applied, but the remaining clutches and the brakes are released. In accordance with this coasting run, moreover, the motive power (i.e., the kinetic energy) of the wheels 33 is transmitted through the gear 32, the output shaft 30 and the gear 31 to the gear 26. Moreover, the motive power of this gear 26 is transmitted through the carrier 25 to the first sun gear 18 and the second sun gear 20.

With the clutch C2 being applied, the first sun gear 18 and the second sun gear 20 are directly connected so that the motive powers of the first sun gear 18 and the second sun gear 20 are transmitted together through the gears 27, 29 and 28 to the motor/generator 15. Moreover, this motor/generator 15 functions as the power generator so that the electric energy generated is charged through the inverter 49 into the battery 50.

In the embodiment as has been described with reference to FIGS. 1 to 5, the torque, as outputted from the continuously variable transmission 2, can be transmitted to the wheels 33 after it is amplified by the motor/generator 15 and the planetary gear mechanism 17. In other words, the control range of the gear ratio of the continuously variable transmission 2 is apparently widened. With respect to the torque to be transmitted to the wheels 33 in response to a demand for an acceleration, therefore, the torque to be inputted from the engine 1 to the continuously variable transmission 2 can be made as low as possible. In the continuously variable transmission 2, therefore, the slippage of the contacting portions between the drive-side pulley 6 and the driven-side pulley 7 and the belt 14 is suppressed to improve the transmission efficiency of the motive power in the continuously variable transmission 2 and the durability of the continuously variable transmission 2. From another aspect, the torque to be transmitted by the continuously variable transmission 2 can be lowered to make the drive-side pulley 6, the driven-side pulley 7 and the belt 14 more compact.

Moreover, the driving force at the time of starting the vehicle can be increased (or assisted) by the functions of the motor/generator 15 and the planetary gear mechanism 17 thereby to improve the starting performance of the vehicle. This assist zone by the motor/generator 15 is determined by the demand for an acceleration such as the accelerator depression and the vehicle speed. When the regenerative brake pattern is selected, moreover, the motor/generator 15 is caused to function as the power generator by the running inertia transmitted from the wheels 33, so that the electric energy generated can be recovered.

With respect to the wheels 33, on the other hand, the motor/generator 15 and the continuously variable transmission 2 are arranged in parallel, and the start clutch C1 is released at the regenerative brake controlling time. As a result, the motive power of the wheels 33 is not transmitted to the engine 1 so that the motive power to be transmitted from the wheels 33 is not consumed by dragging the engine 1. As a result, it is possible to improve the power generation efficiency by the motor/generator 15, i.e., the electric energy recovery efficiency. When the clutch C2 is applied, on the other hand, the first sun gear 18 and the second sun gear 20 rotate together so that the motor/generator 15 can be rotated to function as the power generator at an RPM according to that of the output shaft 30 being decelerated.

In order that the motor/generator 15 may transmit the torque to the second sun gear 20 of the planetary gear mechanism 17, on the other hand, the gears 27, 28 and 29 are provided separately of the planetary gear mechanism 17. This makes it possible to construct the system of FIG. 1 merely by adding the motor/generator 15 and the gears 27, 28 and 29 newly to the existing system having the continuously variable transmission 2 and the planetary gear mechanism 17. In other words, the components can be shared with the existing system, so that the hybrid vehicle of the invention can be provided merely by changing the existing system partially. Moreover, the construction is made such that the motor/generator 15 is separately attached to the outside of the continuously variable transmission and the planetary gear mechanism 17. This makes it possible to employ a motor/generator of excellent mass productivity. For these reasons, it is possible to suppress the cost for manufacturing the hybrid vehicle.

In the ordinary start pattern or the ordinary run pattern, on the other hand, the gear ratio of the planetary gear mechanism 17 can be controlled at two steps by applying the brake B1 or the clutch C2.

Figure 6:
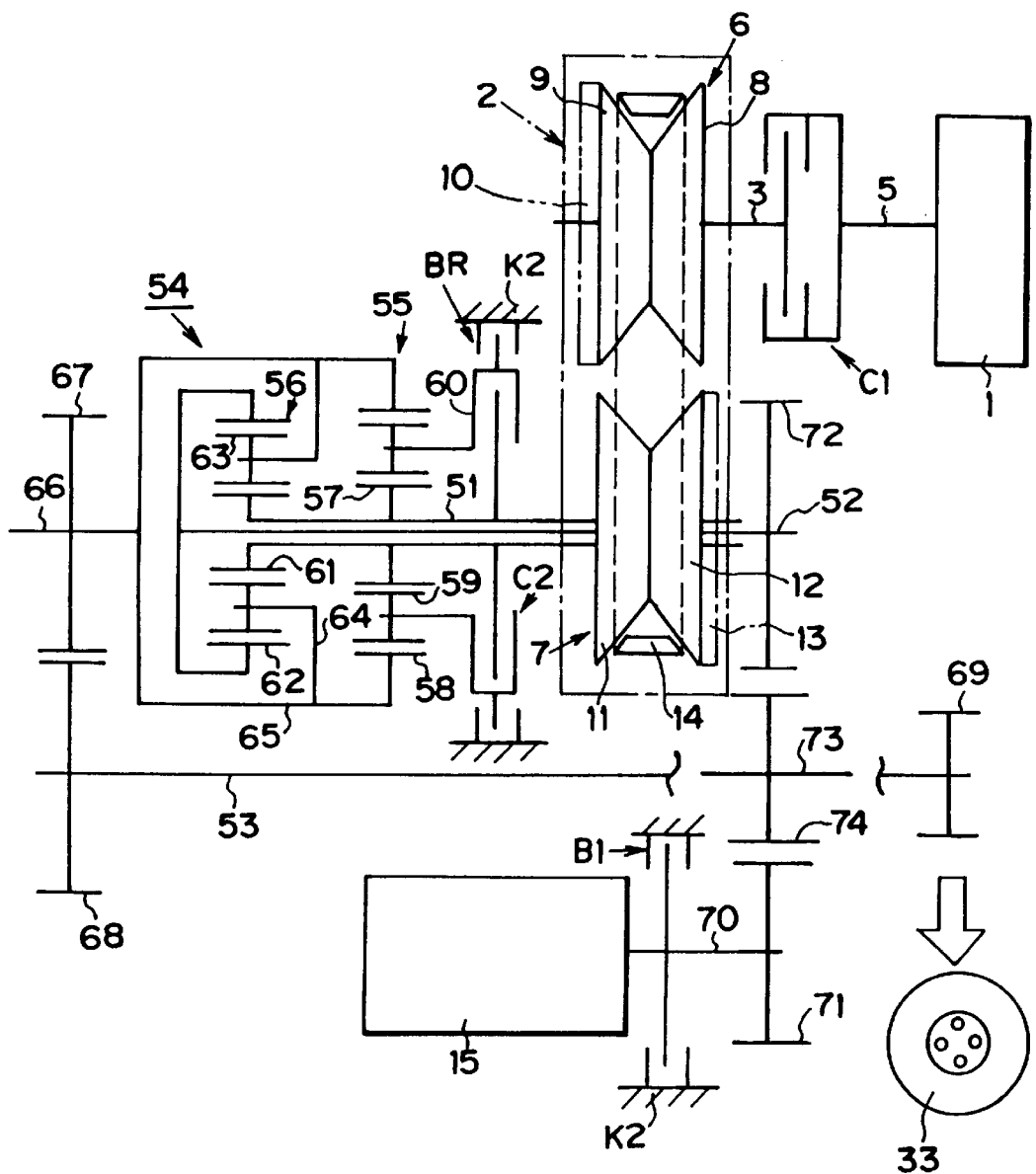
FIG. 6 is a skeleton diagram showing a hybrid vehicle according to another embodiment of the invention.

FIG. 6 is a skeleton diagram showing another embodiment of the invention. Of the components of FIG. 6, the description of the components shared with the construction of FIG. 1 will be omitted by designating them by the same reference numerals as those of FIG. 1. On the output side of the continuously variable transmission 2, there is disposed a hollow shaft 51, in which such a shaft 52 is disposed as can rotate relative to the hollow shaft 51. Moreover, a shaft 53 is provided in parallel with the shaft 52.

The stationary sieve 11 of the aforementioned driven-side pulley 7 is fixed on the hollow shaft 51, and the movable sieve 12 is so disposed as to move in the axial direction of the hollow shaft 51. There is also provided the hydraulic actuator 13 for moving the movable sieve 12 in the axial direction of the hollow shaft 51.

On the other hand, a planetary gear mechanism 54 is provided for controlling the state of the torque transmission between the hollow shaft 51 and the shaft 53. The continuously variable transmission 2 and the planetary gear mechanism 54 are disposed in a casing K2. This planetary gear mechanism 54 is provided with a first planetary gear unit 55 and a second planetary gear unit 56, which are arranged on the common axis. The first planetary gear unit 55 is arranged closer to the continuously variable transmission 2 than the second planetary gear unit 56. The first planetary gear unit 55 is composed of: a first sun gear 57; a first ring gear 58 disposed concentrically of the first sun gear 57; and a first carrier 60 for holding a first pinion gear 59 meshing with the first sun gear 57 and the second ring gear 58. In short, the first planetary gear unit 55 is a single-pinion type planetary gear unit.

On the other hand, the second planetary gear unit 56 is a single-pinion type planetary gear unit composed of: a second sun gear 61; a second ring gear 62 disposed concentrically of the second sun gear 61; and a second carrier 64 for holding a second pinion gear 63 meshing with the second sun gear 61 and the second ring gear 62. Outside of the first ring gear 58 and the second ring gear 62, there is disposed a connecting drum 65, which is integrally connected to the first ring gear 58 and the second carrier 64. On the other hand, the shaft 52 is arranged at its one end inside of the connecting drum 65. The end portion of the shaft 52 on the inner side of the connecting drum 65 is integrally connected to the second ring gear 62. There is also provided the clutch C2 for controlling the state of the torque transmission between the first carrier 60 and the hollow shaft 51. On the side of the casing K2, moreover, there is disposed the reverse brake BR for controlling the rotation/stop of the first carrier 60.

To the outer end portion of the connecting drum 65, there is attached a shaft 66 which is disposed coaxially of the shaft 52. A gear 67 is formed on the shaft 66. On the aforementioned shaft 53, there are formed gears 68 and 69, of which the gear 68 meshes with the gear 67. Moreover, the gear 69 is so connected through the (not-shown) differential gears to the wheels 33 as to transmit the torque.

At the other end of the casing K2, i.e., on the side opposed to the position of the drive-side pulley 6, on the other hand, there is disposed the motor/generator 15, the output shaft 70 of which is arranged in parallel with the shaft 53. A gear 71 is formed on the output shaft 70. On the side of the casing K2, on the other hand, there is disposed the brake B1 for controlling the rotation/stop of the output shaft 70. A gear 72 is formed on the shaft 52, and a shaft 73 is disposed in parallel with the shaft 52 and the output shaft 70. On the shaft 73, there is formed a gear 74, which meshes with the gears 72 and 71. The control system of FIG. 2 can also be employed as that of this system of FIG. 6.

Here will be described the corresponding relations between the embodiment shown in FIG. 6 and the invention. The input shaft 3, the hollow shaft 51, the shaft 66, the output shaft 53 and the gears 67, 68 and 69 construct a route corresponding to the torque transmitting route of the invention. On the other hand, the output shaft 70, the gears 71, 74 and 72 and the shafts 52 and 73 construct a route corresponding to the torque adding route of the invention.

Figure 7:
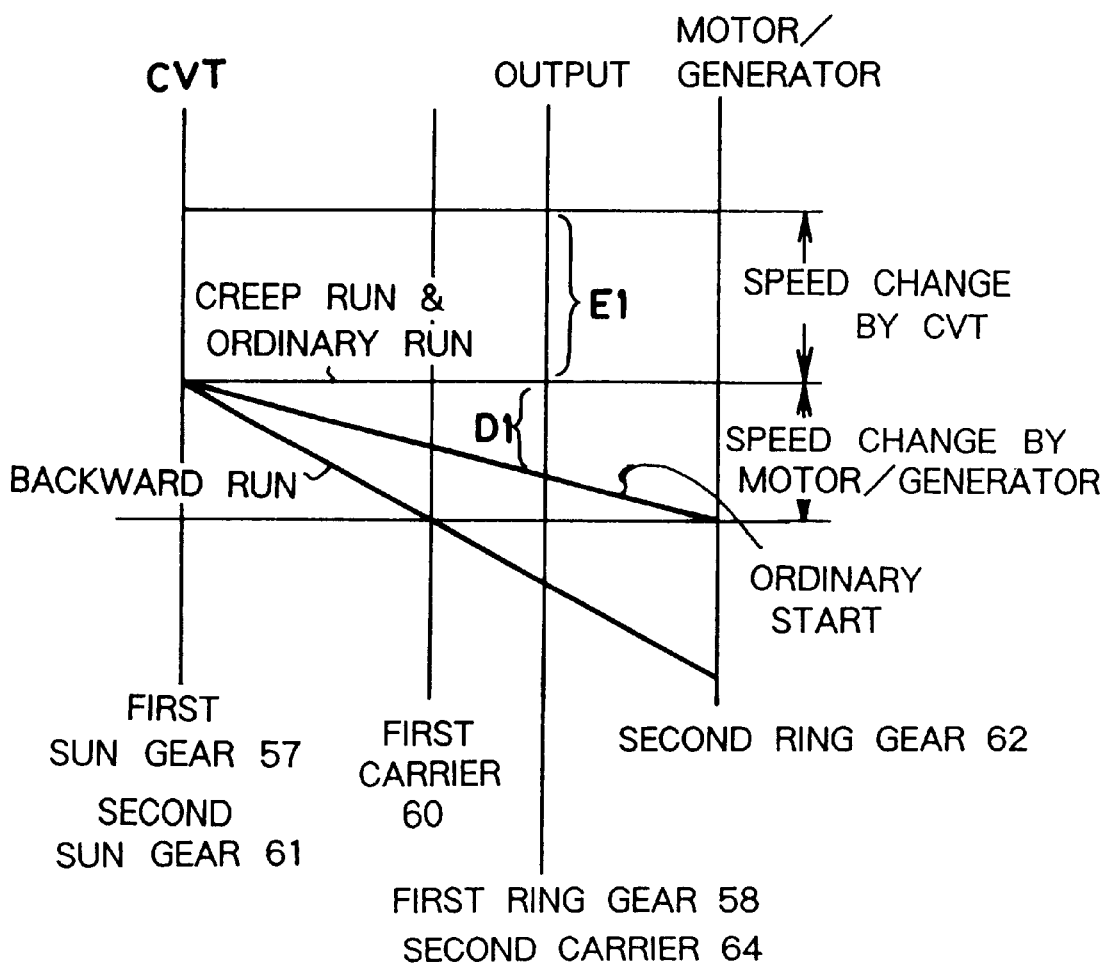
FIG. 7 is a nomographic diagram illustrating the states of rotary elements of a planetary gear mechanism in the embodiment of FIG. 6.

The drive patterns to be selected by the system of FIG. 6 are individually identical to those of FIG. 3. Therefore, the control contents of the system of FIG. 6 will be described with reference to FIG. 7. FIG. 7 is a nomographic diagram illustrating the states in the individual drive patterns of the first sun gear 57, the second sun gear 61, the first carrier 60, the first ring gear 58, the second carrier 64 and the second ring gear 62.

First of all, when the creep run pattern is selected, the clutch C2 is applied, but the other brakes and clutches are released, so that the torque of the motor/generator 15 is transmitted through the gears 71, 74 and 72 to the shaft 52. Then, as shown in FIG. 7, the second sun gear 61, the second carrier 64 and the second ring gear 62 rotate altogether so that their torque is transmitted through the connecting drum 65 to the shaft 66. The torque of this shaft 66 is transmitted through the gears 67 and 68 to the output shaft 53, and the torque of this output shaft 53 is transmitted to generate the driving force of the wheels 33. Here in this creep run pattern, the torque of the engine 1 is not transmitted yet to the input shaft 3. In the embodiment shown in FIG. 6, therefore, the motor/generator 15 acts as the drive means for the vehicle when the creep run pattern is selected.

Next, when the ordinary start pattern is selected, the start clutch C1 is applied, but the other clutches and brakes are released. Then, the torque, as outputted from the crankshaft 5 of the engine 1, is transmitted through the continuously variable transmission 2 to the hollow shaft 51 and the second sun gear 61. On the other hand, the torque of the motor/generator 15 is transmitted through the shaft 52 to the second ring gear 62. Then, the second ring gear 62 is fixed to act as the reaction element, as shown in FIG. 7. As a result, at the instant when the vehicle starts, the second ring gear 62 is fixed to act as the reaction element, and the second carrier 64 rotates at a lower speed than that of the second sun gear 61 so that the torque is outputted from the second carrier 64.

Thus, by the torque of the motor/generator 15, the RPM of the output shaft 53 (or the output RPM) can be controlled within a range D1. When the torque to be transmitted through the continuously variable transmission 2 to the hollow shaft 51 abruptly rises as at a quick start, the second ring gear 62 can be reliably fixed by applying the brake B1.

When the ordinary run pattern is selected, moreover, the start clutch C1 and the clutch C2 are applied, but the other clutches and the brakes are released. When the engine torque is transmitted like before to the hollow shaft 51, therefore, the first sun gear 57, the first carrier 60 and the first ring gear 58 rotate altogether, as shown in FIG. 7. As a result, when this ordinary run pattern is selected, the output RPM can be controlled within a range E1 by controlling the gear ratio of the continuously variable transmission 2.

When the ordinary run pattern is selected, on the other hand, the torque of the motor/generator 15 can be added to the output torque of the continuously variable transmission 2 in accordance with the degree of a demand for an acceleration by transmitting the torque of the motor/generator 15 through the second ring gear 62 to the second carrier 64. When the ordinary run pattern is thus selected, at least the engine 1 is employed as the drive means for the vehicle.

When the backward run pattern is selected, still moreover, the start clutch C1 and the reverse brake BR are applied, but the other brakes and clutches are released. In short, the first carrier 60 is fixed. When the output torque of the continuously variable transmission 2 is transmitted to the first sun gear 57, therefore, the first ring gear 58 rotates in the opposite direction to and at a lower speed than the first sun gear 57, as illustrated in FIG. 7. As a result, the direction of rotation of the output shaft 53 is reversed from that of the remaining drive patterns so that the vehicle runs backward. When this backward run pattern is selected, no torque is outputted from the motor/generator 15. When the backward run pattern is thus selected, the drive means for the vehicle is the engine 1.

When the vehicle comes into the coasting state so that the regenerative brake pattern is selected, the clutch C2 is applied, but the other clutches and the brakes are released. Then, the running inertia, as inputted from the wheels 33, is transmitted through the gear 69, the output shaft 53 and the gears 68 and 67 to the shaft 66. When the torque of the shaft 66 is further transmitted to the connecting drum 65, the second carrier 64, the second ring gear 62 and the second sun gear 61 rotate altogether. Moreover, the torque of the shaft 51 is transmitted through the gears 72, 74 and 71 to the motor/generator 15. Then, the motor/generator 15 functions as the power generator. The electric energy generated is charged through the inverter 49 into the battery 50.

In the embodiment thus far described with reference to FIG. 6, too, the torque, as outputted from the continuously variable transmission 2, can be amplified by the functions of the motor/generator 15 and the planetary gear mechanism 54 and transmitted to the wheels 33. Therefore, effects similar to those of the embodiment shown in FIGS. 1 to 5 can also be obtained from the embodiment shown in FIG. 6. Here, the embodiments of FIGS. 1 to 7 can be applied to an FF vehicle (i.e., a front-engine front-drive vehicle) and an FR vehicle (i.e., a front-engine rear-drive vehicle).

Here, there has been proposed in the prior art the hybrid vehicle which can aid (or assist) the output of the engine with the function of the electric motor while the vehicle is running. In this hybrid vehicle, the electric motor is arranged on the output side of the engine, and the transmission is disposed on the torque transmitting route between the electric motor and the wheels. In this hybrid vehicle, on the other hand, the electric motor is caused to function as the power generator, while the vehicle is being decelerated, by transmitting the motive power inputted from the wheels to the electric motor, so that the electric energy generated can be recovered.

In this hybrid vehicle, the reduction ratio of the transmission has to be set high so that a high assist torque may be obtained while making the size of the electric motor as small as possible. When the reduction ratio of the transmission is set high, however, such a problem arises if the vehicle runs at a high speed at a high gear ratio of the transmission that the electric motor is overheated as its RPM exceeds the allowable value.

On the other hand, the transmission is provided with the frictional engagement elements to be operated by a hydraulic control, such as the wet-type multi-disc clutch or the band brake. If the gear ratio of the transmission is to be set high as before, therefore, there arises a problem that the structure of the system including the frictional engagement elements is made complex and heavy. On the other hand, there is complicated the switching timing or the hydraulic control of applying/releasing the frictional engagement elements. As a result, a control circuit is needed for the electronic control unit which is provided for controlling the application/release and the oil pressure of the frictional engagement elements. For these reasons, there may arise the cost for manufacturing the hybrid vehicle. Therefore, an embodiment of the hybrid vehicle capable of solving those problems will be described with reference to FIG. 8.

Figure 8:
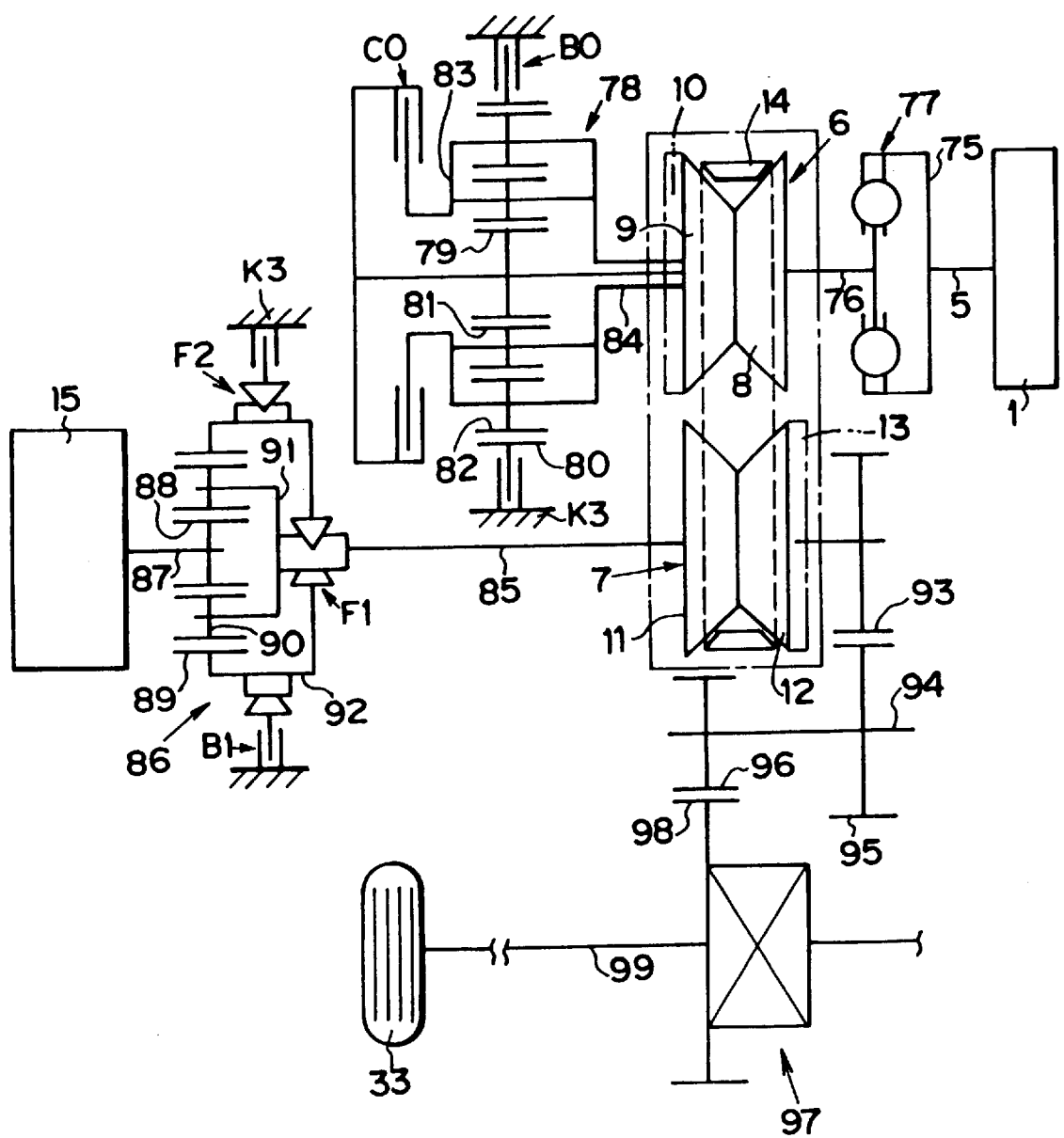
FIG. 8 is a skeleton diagram showing a hybrid vehicle according to another embodiment of the invention.

A hybrid vehicle shown in FIG. 8 belongs to the FF (i.e., the front engine front-drive) type vehicle. The crankshaft 5 of the engine 1 is equipped with a flywheel 75. In FIG. 8, moreover, there is adopted the so-called "transverse engine type", in which the crankshaft 5 is arranged in the transverse direction of the vehicle. On the other hand, an input shaft 76 is disposed coaxially of the crankshaft 5. A damper 77 is disposed on the torque transmitting route between the input shaft 76 and the flywheel 75.

There is provided a first planetary gear mechanism 78 which corresponds to that input shaft 76. The first planetary gear mechanism 78 is disposed in a casing K3. This first planetary gear mechanism 78 is composed of: a sun gear 79 formed on the input shaft 76; a ring gear 80 disposed outside of the sun gear 79; a first pinion gear 81 meshing with the sun gear 79; a second pinion gear 82 meshing with the first pinion gear 81 and the ring gear 80; and a carrier 83 holding the first pinion gear 81 and the second pinion gear 82. In short, the first planetary gear mechanism 78 is the so-called "double-pinion type planetary gear mechanism".

For this first planetary gear mechanism 78, on the other hand, a clutch C0 and a brake B0 are provided on the side of the casing K3. The clutch C0 controls the state of the torque transmission between the carrier 83 and the input shaft 76, and the brake B0 controls the rotation/stop of the ring gear 80.

To the carrier 83, moreover, there is connected a hollow shaft 84, which is so coaxially mounted around the input shaft 76 so that the hollow shaft 84 and the input shaft 76 can rotate relative to each other. On the other hand, there is provided an intermediate shaft 85 in parallel with the input shaft 76. Inside of the casing K3, moreover, there is disposed the continuously variable transmission 2 for effecting the mutual torque transmission between the input shaft 76 and the intermediate shaft 85. Of the construction of the continuously variable transmission 2 of FIG. 8, the description of the same portions as those shown in FIG. 1 will be omitted by designating them by the common reference numerals.

The stationary sieve 8 of the drive-side pulley 6 is fixed on the hollow shaft 84. Moreover, the movable sieve 9 of the drive-side pulley 6 is made movable in the axial direction of the hollow shaft 84. On the other hand, the stationary sieve 11 of the driven-side pulley 7 is fixed on the intermediate shaft 85. Moreover, the movable sieve 12 of the driven-side pulley 7 is made movable in the axial direction of the intermediate shaft 85.

Inside of the casing K3, moreover, the motor/generator 15 is disposed coaxially of the intermediate shaft 85. On the torque transmitting route between the intermediate shaft 85 and the motor/generator 15, on the other hand, there is disposed a second planetary gear mechanism 86. This second planetary gear mechanism 86 is composed of: a sun gear 88 formed on the output shaft 87 of the motor/generator 15; a ring gear 89 arranged concentrically with respect to the sun gear 88; and a carrier 91 holding a pinion gear 90 meshing with the sun gear 88 and the ring gear 89. The carrier 91 is connected to one axial end of the intermediate shaft 85. In short, the second planetary gear mechanism 86 is a single-pinion type planetary gear mechanism.

On the other hand, the ring gear 89 is formed on the inner circumference of a connecting drum 92. Moreover, a first one-way clutch F1 is mounted at its inner race on the intermediate shaft 85 and at its outer race on the connecting drum 92. Moreover, a second one-way clutch F2 is mounted at its inner race on the connecting drum 92. On the side of the casing K3, there is disposed the brake B1 for controlling the rotation/stop of the outer race of the second one-way clutch F2.

At the end portion of the intermediate shaft 85 on the side of the engine 1, there is formed a gear 93. Inside of the casing K3, moreover, there is disposed an output shaft 94 which is in parallel with the intermediate shaft 85. On this output shaft 94, there are formed gears 95 and 96. Moreover, the gear 93 and the gear 95 mesh with each other.

Inside of the casing K3, on the other hand, there is disposed a differential gears 97, the ring gear 98 of which meshes with the gear 96. The differential gears 97 is of the well-known type including the differential case, the pinion gear, the side gear and so on. To the output side of the differential gears 97, there are connected right and left front drive shafts 99. Each of these drive shafts 99 is exposed to the outside of the casing K3. The right and left (front) wheels are individually connected to those front drive shafts 99. To the system of FIG. 8, there can also be applied the control system of FIG. 2. In this case, the oil pressures to act on the clutch C0 and the brakes B0 and B1 are controlled by the hydraulic control unit 45 shown in FIG. 2.

Here will be described the corresponding relations between the construction shown in FIG. 8 and the invention. The second planetary gear mechanism 86 corresponds to the planetary gear mechanism of the invention. On the other hand, the input shaft 76, the intermediate shaft 85, the shaft 94, the differential gears 97 and the front drive shaft 99 construct a route corresponding to the torque transmitting route of the invention. Moreover, the output shaft 87, the connecting drum 92 and the intermediate shaft 85 construct a route corresponding to the torque adding route of the invention.

The controls on the system shown in FIG. 8 will be described with reference to the diagram of FIG. 9. FIG. 9 is a diagram tabulating corresponding relations among the various drive patterns, the states of the frictional engagement elements and the drive/driven means. In the embodiment shown in FIG. 8, too, it is possible to make controls corresponding to the individual drive patterns such as the creep run, the ordinary start, the ordinary run, the regenerative brake and the backward run on the basis of the running state of the vehicle. The relations between these individual drive patterns and the running state of the vehicle are similar to those tabulated in the diagram of FIG. 3. In FIG. 9: "circle" symbols imply that the frictional engagement elements are applied; a "triangle" symbol imply that the frictional engagement element is applied when the vehicle is quickly started; and blanks imply that the frictional engagement elements are released.

First of all, when the creep run pattern is selected, the brake B1 and the second one-way clutch F2 are applied, but the other clutches and brakes are released. In short, the ring gear 89 is fixed. On the other hand, the clutch C0 and the brake B0 are released to block the torque transmitting route between the engine 1 and the continuously variable transmission 2. If, in this state, the torque of the motor/generator 15 is transmitted to the sun gear 88, the ring gear 89 functions as the reaction element so that the RPM of the sun gear 88 is decelerated with respect to the carrier 91, and the torque of the carrier 91 is transmitted to the intermediate shaft 85. In short, the second planetary gear mechanism 86 has a function as the so-called "transmission" to decelerate the intermediate shaft 85 with respect to the motor/generator 15.

The torque of the intermediate shaft 85 is transmitted through the gears 93 and 95, the output shaft 94 and the gear 96 to the differential gears 97. Then, the torque, as transmitted to the differential gears 97, is transmitted by the front drive shafts 99 to generate the driving force of the right and left wheels 33. Thus, at the time of the creep run, the motor/generator 15 acts as the drive means for the vehicle.

When the ordinary start pattern is selected, on the other hand, the brake B1, the second one-way clutch F2 and the clutch C0 are applied, but the other clutches and brakes are released. When, in this state, the torque of the engine 1 is transmitted to the input shaft 76, the sun gear 79 and the carrier 83 rotate together so that their torque is transmitted through the hollow shaft 84 to the continuously variable transmission 2. The torque thus inputted to the continuously variable transmission 2 is transmitted through the drive-side pulley 6, the belt 14 and the driven-side pulley 7 to the intermediate shaft 85. Here, the control contents of the continuously variable transmission 2 are similar to those of the embodiment of FIG. 1.

On the other hand, the second one-way clutch F2 and the brake B1 are applied, the torque of the motor/generator 15 is amplified and transmitted to the intermediate shaft 85 as at the control time of the creep run. As a result, the torque of the motor/generator 15 is added to the output torque of the continuously variable transmission 2 so that the summed torque is transmitted to the output shaft 94. Thus, at the ordinary start time, the engine 1 and the motor/generator 15 are the drive means for the vehicle.

When the ordinary run pattern is selected, moreover, the brake B1 and the clutch C0 are applied, but the other clutches and brakes are released. Then, the torque of the engine 1 is inputted as at the ordinary start pattern time to the continuously variable transmission 2, and the torque is outputted from the continuously variable transmission 2 and transmitted to the output shaft 94. In this case, no torque is outputted from the motor/generator 15, and only the engine 1 is the drive means for the vehicle. When the demand for the acceleration exceeds a predetermined value, on the contrary, the motor/generator 15 is driven so that its torque is transmitted to the ring gear 89 to apply the second one-way clutch F2. As a result, the ring gear 89 functions as the reaction element so that the torque of the motor/generator 15 is amplified and transmitted to the intermediate shaft 85. In short, when the ordinary run pattern is selected, too, the engine 1 and the motor/generator 15 are the drive means for the vehicle like the case in which the ordinary start pattern is selected.

When the backward run pattern is selected, on the other hand, the brake B0 is applied, but the other brakes and the clutches are released. When the torque of the engine 1 is transmitted to the input shaft 76, therefore, the ring gear 82 functions as the reaction element so that the carrier 83 rotates in the opposite direction to the rotation at the forward run. Then, the transmission route of the torque outputted from the carrier 83 is similar to that at the ordinary start time, and the torque is transmitted to the wheels 33 to generate a driving force to move the vehicle backward. At this backward run time, the torque of the intermediate shaft 85 is also transmitted through the second planetary gear mechanism 86 to the motor/generator 15. However, the brake B1 is released so that the motor/generator motor/generator can be stopped. If the driving force of the motor/generator 15 is necessary, however, the first one-way clutch F1 of the second planetary gear mechanism 86 is applied by rotating the motor/generator 15 opposite to the aforementioned direction to connect the motor/generator 15 and the intermediate shaft 85 directly.

When the regenerative brake pattern is selected, on the other hand, the brake B1 is continuously applied by the hydraulic control unit 45, but the other brakes and the clutches are released so that the motor/generator 15 acts as the power generator. On the other hand, the running inertia, as inputted from the wheels 33, is transmitted through the differential gears 97 to the intermediate shaft 85.

Then, the first one-way clutch F1 is applied so that the ring gear 89, the carrier 91 and the sun gear 88 are caused to rotate altogether by the torque of the intermediate shaft 85 to connect the intermediate shaft 85 and the output shaft 87 directly. Thus, the motive power is inputted from the intermediate shaft 85 to the motor/generator 15 so that the battery 50 is charged with the electric energy generated by the motor/generator 15. Thus, when the regenerative brake pattern is selected, the motor/generator 15 acts as the driven means. As thus described, the one-way clutches F1 and F2 perform: a role to be applied, only when one rotary element rotates in a predetermined direction, to transmit the torque to the other rotary element; and a role to cause, when one rotary element rotates, the other rotary element to function as the reaction element.

According to the embodiment thus far described with reference to FIGS. 8 and 9, the torque of the motor/generator 15 is amplified by the second planetary gear mechanism 86 and transmitted to the output side of the continuously variable transmission 2. As a result, the torque of the continuously variable transmission 2 and the torque of the motor/generator 15 are summed and transmitted to the wheels 33. As a result, the torque to be transmitted from the engine 1 to the continuously variable transmission 2 is lower than that to be transmitted to the wheels 33. In the embodiment of FIGS. 8 and 9, therefore, the power transmission efficiency and the durability of the continuously variable transmission 2 can also be improved for the same reasons as those of the embodiment of FIGS. 1 to 3.

On the other hand, the torque of the motor/generator 15 is added to the torque outputted from the continuously variable transmission 2. Even when the reduction ratio of the continuously variable transmission 2 is set so high as to make the motor/generator 15 compact, therefore, the RPM of the motor/generator 15 does not rise so high at a high-speed running time as to exceed the allowable value. As a result, the motor/generator 15 can be prevented from being overheated, to improve its own durability.

According to the embodiment shown in FIGS. 8 and 9, moreover, the first one-way clutch F1 is applied/released by switching the controlled state of the motor/generator 15 between the electric motor (for the power running) and the power generator (for the regeneration). At the power running time and the regenerating time, it is possible to make the gear ratios different on the input side and the output side of the second planetary gear mechanism 86 (that is, to set a plurality of gear stages). As a result, the second planetary gear mechanism 86, which is connected in the torque transmittable manner to the output shaft 30 so as to reduce the torque of the motor/generator 15, can be switched between the decelerated state and the directly connected state without any control by a special control system, and neither the switching timing nor the oil pressure need be controlled. This can simplify the system and suppress the manufacture cost.

Although the invention has been described in connection with its specific embodiments, it should not be limited thereto. Therefore, the transmission in the invention may be exemplified by a toroidal (or traction) type continuously variable transmission, a hydraulic type continuously variable transmission in which the oil pressure is established by an input-side member to rotate an output-side member, or a gear type transmission.

On the other hand, the start clutch employed in the above specific embodiments may be replaced by a torque converter.

Here will be synthetically described the advantages to be obtained by the invention.

When the torque to satisfy a demand for the driving force for the vehicle is to be transmitted to the wheels, according to the invention, the torque to be transmitted from the output side of the transmission to the wheels can be increased or amplified by the functions of the second driving force source and the planetary gear mechanism. This makes it possible to reduce the torque to be inputted from the first driving force source to the transmission. As a result, the slippage between the members for transmitting the torque between the input side and the output side of the transmission can be suppressed to improve the power transmission efficiency and the durability of the transmission.

According to the invention, on the other hand, the torque to be transmitted from the output side of the transmission to the wheels can be increased or amplified by the functions of the second driving force source and the plurality of planetary gear units. As a result, the power transmission efficiency and the durability of the transmission can be improved, as described above.

According to the invention, moreover, the torque to be outputted from the transmission is transmitted through the first sun gear to the carrier. When the torque of the electric motor is transmitted to the second sun gear, moreover, this second sun gear functions as the reaction element so that the RPM of the first sun gear is decelerated and transmitted to the carrier. In response to a change in the demand for the driving force for the vehicle, therefore, the torque to be inputted from the first driving force source to the transmission can be reduced to improve the power transmission efficiency and the durability of the transmission, as described above.

According to the invention, still moreover, the torque to be outputted from the transmission is transmitted to the second sun gear. When the torque of the second driving force source is transmitted to the second ring gear, this second ring gear then functions as the reaction element so that the torque of the second sun gear is decelerated and transmitted to the second carrier. In response to a change in the demand for the driving force for the vehicle, therefore, the torque to be inputted from the first driving force source to the transmission can be reduced to improve the power transmission efficiency and the durability of the transmission, as described above.

According to the invention, moreover, the torque of the second driving force source is transmitted, after amplified, to the output side of the transmission so that the output torque of the transmission and the torque of the second driving force source are summed and transmitted to the wheels. In response to the change in the demand for the driving force for the vehicle, therefore, the torque to be inputted from the first driving force source to the transmission can be reduced to improve the power transmission efficiency and the durability of the transmission, as described above.

What is claimed is:

1. A hybrid vehicle, which has: a first driving force source; a transmission for transmitting a torque of said first driving force source therethrough to wheels; a second driving force source; and a torque transmitting route interposed between said first driving force source and said wheels for inputting the torque of said second driving force source, comprising:

a torque adding route for synthesizing the torque outputted from said transmission and the torque transmitted from said second driving force source, to output the synthesized torque to an output member.

2. A hybrid vehicle according to claim 1, wherein said torque adding route includes: a first input member to which the torque is transmitted from said transmission; and a second input member to which the torque is transmitted from said second driving force source, and wherein the torques inputted from said first and second input members are synthesized and outputted from said output member.

3. A hybrid vehicle according to claim 1, wherein said torque adding route includes at least one set of planetary gear mechanisms.

4. A hybrid vehicle according to claim 1, wherein said torque adding route includes a Ravigneaux type planetary gear mechanism having: a first sun gear to which the torque is transmitted from said transmission; a ring gear arranged concentrically of said first sun gear; a first pinion gear meshing with said first sun gear; a second pinion gear meshing with said first pinion gear and said ring gear; a carrier holding said first and second pinion gears rotatably and revolvably for transmitting the torque to said output member; and a second sun gear, to which the torque is transmitted from said second driving force source, and which meshes with said second pinion gear.

5. A hybrid vehicle according to claim 4, further comprising:

clutch means for connecting said first sun gear and said second sun gear selectively.

6. A hybrid vehicle according to claim 4, further comprising:

brake means for fixing said second sun gear selectively.

7. A hybrid vehicle according to claim 4, further comprising:

brake means for fixing said ring gear selectively.

8. A hybrid vehicle according to claim 1, wherein said torque adding route includes:

a first planetary gear unit having: a first sun gear to which the torque is inputted from said transmission; a first ring gear which is arranged concentrically of said first sun gear and to which the torque is transmitted from said second driving force source; and a first carrier holding a first pinion gear meshing with said first sun gear and said first ring gear rotatably and revolvably and for transmitting the torque to said output member; and a second planetary gear unit having: a second sun gear connected to said first sun gear to rotate integrally therewith; a second ring gear arranged concentrically of said second sun gear and connected to said first carrier to rotate integrally therewith; and a second carrier holding a second pinion gear meshing with said second sun gear and said second ring gear, rotatably and revolvably.

9. A hybrid vehicle according to claim 8, further comprising:

brake means for fixing said second carrier selectively.

10. A hybrid vehicle according to claim 8, further comprising:

brake means for selectively fixing any of a plurality of rotary members composing a torque transmitting route from said second driving force source to said first ring gear.

11. A hybrid vehicle according to claim 1, wherein said torque adding route includes a planetary gear mechanism having: a sun gear to which the torque is inputted from said second driving force source; a ring gear arranged concentrically of said sun gear; and a carrier which holds a pinion gear meshing with said sun gear and said ring gear rotatably and revolvably and which is connected to said output member transmitted with the torque transmitted from said transmission.

12. A hybrid vehicle according to claim 11, further comprising:

brake means for fixing said ring gear selectively.

13. A hybrid vehicle according to claim 12, wherein said brake means includes a one-way clutch and a multi-disc brake arrayed in series with each other between said ring gear and a stationary portion.

14. A hybrid vehicle according to claim 11, further comprising:

clutch means for connecting said ring gear and said carrier selectively.

15. A hybrid vehicle according to claim 14, wherein said clutch means includes a one-way clutch to be applied when the torque is inputted from said output member to said carrier.

16. A hybrid vehicle according to claim 11, further comprising:

a forward/backward switching mechanism interposed between said first driving force source and said transmission.

17. A hybrid vehicle according to claim 16, wherein said forward/backward switching mechanism includes a set of planetary gear mechanisms.

18. A hybrid vehicle according to claim 17, wherein said planetary gear mechanism has: a sun gear to which the torque is transmitted from said first driving force source; a ring gear arranged and selectively fixed concentrically of said sun gear; and a carrier holding a first pinion gear meshing with said sun gear and a second pinion gear meshing with said first pinion gear and said ring gear rotatably and revolvably for transmitting the torque to said transmission and for being selectively connected to said sun gear.

19. A hybrid vehicle according to claim 1, further comprising:

first clutch means connecting and releasing said first driving force source selectively to and from said torque adding route; and second clutch means for rotating said torque adding route integrally as a whole.

20. A hybrid vehicle according to claim 1, wherein said torque adding route includes a backward run mechanism for reversing and outputting the torque transmitted from said transmission.

21. A hybrid vehicle according to claim 1, wherein said torque adding route includes a speed change mechanism for switching the torque transmitted from said second driving force source, into at least two high and low gear stages and for outputting the switched torque.

22. A hybrid vehicle according to claim 1, wherein said transmission includes a continuously variable transmission.

23. A hybrid vehicle according to claim 22,
wherein said continuously variable transmission includes a belt type continuously variable transmission having: a drive-side pulley having a changeable groove width; a driven-side pulley having a changeable groove width; and a belt made to run on said pulleys.

24. A hybrid vehicle according to claim 1,
wherein said first driving force source includes an internal combustion engine, and
wherein said second driving force source includes an electric motor.

25. A hybrid vehicle according to claim 1,
wherein said first driving force source includes an internal combustion engine, and
wherein said second driving force source includes a motor/generator having the functions of an electric motor and a power generator.

26. A hybrid vehicle according to claim 25,
wherein said torque adding route includes a speed change mechanism for enlarging the gear ratio when the torque is to be outputted from said motor/generator, and for reducing the gear ratio when the torque is to be inputted to said motor/generator.

27. A hybrid vehicle according to claim 26,
wherein said speed change mechanism includes a planetary gear mechanism having: a sun gear to which the torque is inputted from said second driving force source; a ring gear arranged concentrically of said sun gear; and a carrier which holds a pinion gear meshing with said sun gear and said ring gear rotatably and revolvably and to which the torque is transmitted from said transmission.

28. A hybrid vehicle according to claim 27, further comprising:
brake means for fixing said ring gear selectively; and clutch means for connecting said ring gear and said carrier selectively.

29. A hybrid vehicle according to claim 28,
wherein said brake means includes a one-way clutch and a multi-disc clutch arrayed in series with each other between said ring gear and a stationary portion, and
wherein said clutch means includes a one-way clutch to be applied when the torque is inputted from said output member to said carrier.

* * * * *